United States Patent [19]
Schreiter

[11] Patent Number: 5,628,566
[45] Date of Patent: May 13, 1997

[54] PROFILE SEALING FLANGE

[75] Inventor: Michael E. Schreiter, Appleton, Wis.

[73] Assignee: Reynolds Consumer Products, Inc., Appleton, Wis.

[21] Appl. No.: 593,200

[22] Filed: Jan. 29, 1996

[51] Int. Cl.$^6$ .................................... B65D 33/25
[52] U.S. Cl. .................... 383/63; 24/587; 156/66; 493/213
[58] Field of Search ................ 156/66; 24/587; 493/213, 214; 383/63, 64, 65

[56] References Cited

U.S. PATENT DOCUMENTS

| | | | |
|---|---|---|---|
| 3,758,370 | 9/1973 | Sakurai et al. | 161/69 |
| 4,268,938 | 5/1981 | Walchli | 24/201 C |
| 4,354,541 | 10/1982 | Tilman | 150/3 |
| 4,673,383 | 6/1987 | Bentsen | 493/381 |
| 4,731,911 | 3/1988 | Gould | 24/587 |
| 4,744,674 | 5/1988 | Nocek | 383/63 |
| 4,824,497 | 4/1989 | Tilman | 156/66 |
| 4,909,017 | 3/1990 | McMahon et al. | 156/66 |
| 5,216,787 | 6/1993 | Custer et al. | 24/587 |
| 5,232,763 | 8/1993 | Holbek et al. | 428/167 |
| 5,242,516 | 9/1993 | Custer et al. | 156/66 |
| 5,272,794 | 12/1993 | Hamatani et al. | 24/476 |
| 5,351,369 | 10/1994 | Swain | 24/304 |
| 5,366,294 | 11/1994 | Wirth et al. | 156/66 |
| 5,572,614 | 11/1996 | Tilman et al. | 156/66 |

FOREIGN PATENT DOCUMENTS

| | | | |
|---|---|---|---|
| 1140723 | 8/1967 | France | 383/63 |
| 1587609 | 4/1981 | United Kingdom. | |
| 2080412 | 2/1982 | United Kingdom. | |

*Primary Examiner*—Stephen P. Garbe
*Attorney, Agent, or Firm*—Alan T. McDonald

[57] ABSTRACT

A profile sealing strip for providing a resealable closure includes a lateral flange, a sealant layer, and a closure portion. The lateral flange has a first and second section each having a length, an outer surface, and an inner surface. A plurality of ribs extends along the length of the outer surfaces wherein adjacent ones of the ribs form a channel therebetween. The closure portion includes a closure means and a base. The base of the closure portion is disposed between and connected to the first and second sections of said lateral flange. The closure means protrudes beyond the inner surfaces of the first and second sections of the lateral flange. The sealant layer has a first portion and a second portion. The first portion of the sealant layer is adjacent the first section of the lateral flange and connected to outer segments of the ribs. The second portion of the sealant layer is adjacent the second section of the lateral flange and connected to outer segments of the ribs. Corresponding mating profile sealing strips are then attached to a package by a heat-sealing process which provides the package with a reclosable seal.

25 Claims, 5 Drawing Sheets

PROFILE SEALING FLANGE

FIELD OF THE INVENTION

The present invention generally relates to a sealing device attached to a package which allows for resealable sealing of the package and, in particular, to structural features at the interface between the sealing device and the package that enhance the strength of the bond at that interface.

BACKGROUND OF THE INVENTION

Resealable packages are widely used in the packaging of a variety of products, especially food. Resealable packages are convenient in that after the initial opening, consumers can close and reseal the package to better preserve the enclosed contents. Thus, a consumer avoids having to locate a storage container for the unused portion of the products in the package. As such, providing products in resealable packages appreciably enhances the marketability of those products.

Often, a resealable sealing device is produced as a separate item from the package and is attached to and made integral with the package at a later point in the manufacturing process. Air and water tend to migrate into the package at a higher rate near the sealing device. Two critical factors in preserving the contents in a resealable package include the integrity of the seal and the integrity of the region of the package at the interface of the sealing device. Thus, it is desirable to have a structurally sound bond at the interface between the sealing device and the package.

A typical resealable sealing device is a reclosable zipper which is affixed to the package by a heat and pressure sealing process. The zipper generally includes a pressure fastenable seal in the form of a rib, or male member, located on one package wall and a mating groove, or female member, located on an opposing package wall. To function as a reclosable zipper, the interlocking members of the closure arrangement should be made of a flexible polymeric material. The packages are also made of polymeric materials since these materials inhibit the migration of air and water from or into the package. The packages can be flexible or rigid.

Attaching a reclosable zipper to the package is fairly simple when both the zipper and the package material are made of compatible materials. By applying heat and pressure in the typical heat-sealing process, the zipper and package are made integral. A good example of this concept is a reclosable polyethylene sandwich bag utilizing a polyethylene zipper. Alternatively, in some arrangements, the packages and zipper devices are made from different materials. For example, packages made from polyester not only protect food from minor air and water losses but also minimize flavor scalping from food. But, these polyester packages often have polyethylene or polypropylene zippers. In this situation, a sealant layer between the zipper and the package is used which adequately bonds to both of the dissimilar materials. Thus, one side of the sealant layer bonds with the material of the zipper, while the other side of sealant layer bonds with the material of the package. Generally, the sealant layer is co-extruded with the closure device such that the sealant layer is bonded to the closure device. A method for co-extruding a sealant layer with a closure profile is disclosed in U.S. Pat. No. 5,242,516 issued to Custer et al. which is herein incorporated by reference. It has been shown that a complete sheet of sealant material generally cannot be co-extruded with the closure profile without causing the closure profile to become distorted after the two pieces are cooled due to the differences in the coefficient of thermal expansion.

When sealant layers are used, particular attention is placed on the heat-sealing process. To ensure an adequate bond, the dwell time and temperature of the heating process must be enough such that both sides of the sealant layer melt to their corresponding parts. Additionally, if the heat-sealing bar applying the heat load into the sealant layer becomes misaligned, then the sealant layer may not fully adhere to the zipper device or the package.

If the heat-sealing process is not performed adequately, the package will leak under the zipper device. And, when the consumer pulls the male closure portion away from the female closure portion to open the zipper, the imperfection could possibly enlarge. Thus, it is imperative that the bond is strong enough to resist tearing at this interface.

A need therefore exists to provide a structure at the interface between the closure profile and the package which further enhances the strength of the bond while still allowing the closure profile to be co-extruded with a sealant layer.

SUMMARY OF THE INVENTION

In one particular embodiment, the present invention provides a profile strip which is to be attached to a package that allows for a resealable closure. The profile sealing strip includes a lateral flange with two sections, a closure portion, and a sealant layer. Both sections of the lateral flange include a plurality of ribs extending along the length of their outer surfaces. Adjacent ribs form a channel therebetween along the outer surface. The closure portion is disposed between, and connected to, the two sections of the lateral flange. The closure portion includes a closure means which protrudes below an inner surface of the lateral flange. The sealant layer has two portions each of which corresponds and is attached to one of the sections of the lateral flange at the outer segment of the ribs.

The purpose of the sealant layer is to bond the lateral flange and closure portion to the package. Thus, the sealant layer adheres to the material of the package and the material of the lateral flange. When the sealant layer, lateral flange, and closure portion are attached to a package through a heat-sealing process, the region of the sealant layer above the channels which is not in contact with the lateral flange first begin to melt. The flow of melting material in this region begins to fill the channels formed by the ribs. Eventually, a majority of the sealant layer liquifies and adheres to the surface area of the ribs and the package.

In another embodiment, the channels are formed by ribs extending from the sealant layer and engaging a planar lateral flange. Again, the lack of heat conduction above the channels causes the temperature in this region to rise and, consequently, the sealant layer begins to melt.

The embodiments described above result in the sealant layer being more susceptible to melting during the heat-sealing process. Thus, the likelihood that the sealant layer will not adhere to the lateral flange and the package is reduced in the event the process dwell time or applied heat is errant. These embodiments also help ensure the melting of the sealant layer when the heat-sealing bar is misaligned.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

Figure 1:
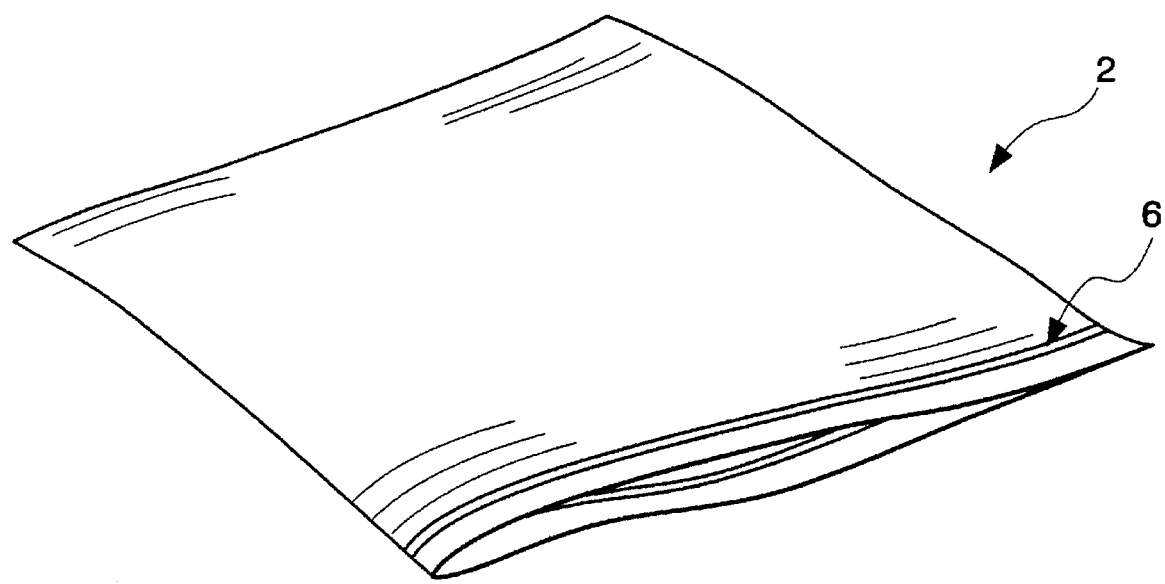
FIG. 1 is a perspective view of a typical flexible reclosable package embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 2:
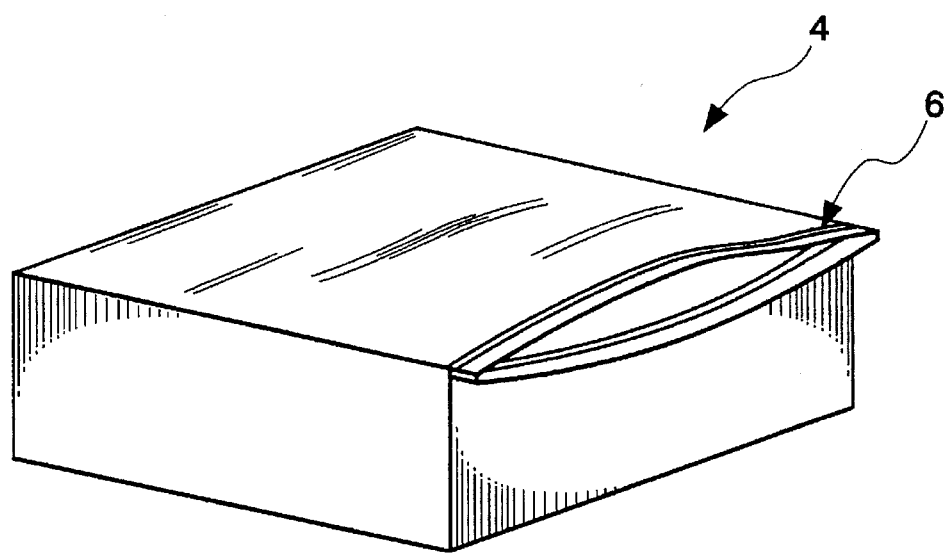
FIG. 2 is a perspective view of a typical rigid reclosable package embodying the present invention.

Turning now to the drawings, FIGS. 1 and 2 are perspective views depicting a flexible reclosable package 2 and a rigid reclosable package 4, respectively. In FIGS. 1 and 2, a reclosable seal 6 is illustrated at the opening of each package 2, 4. The reclosable seal 6 is in the form of a zipper device which includes two mating pieces. FIGS. 1 and 2 are illustrative of the type of packages in which the present invention, the profiled sealing flange, can be employed.

Figure 3:
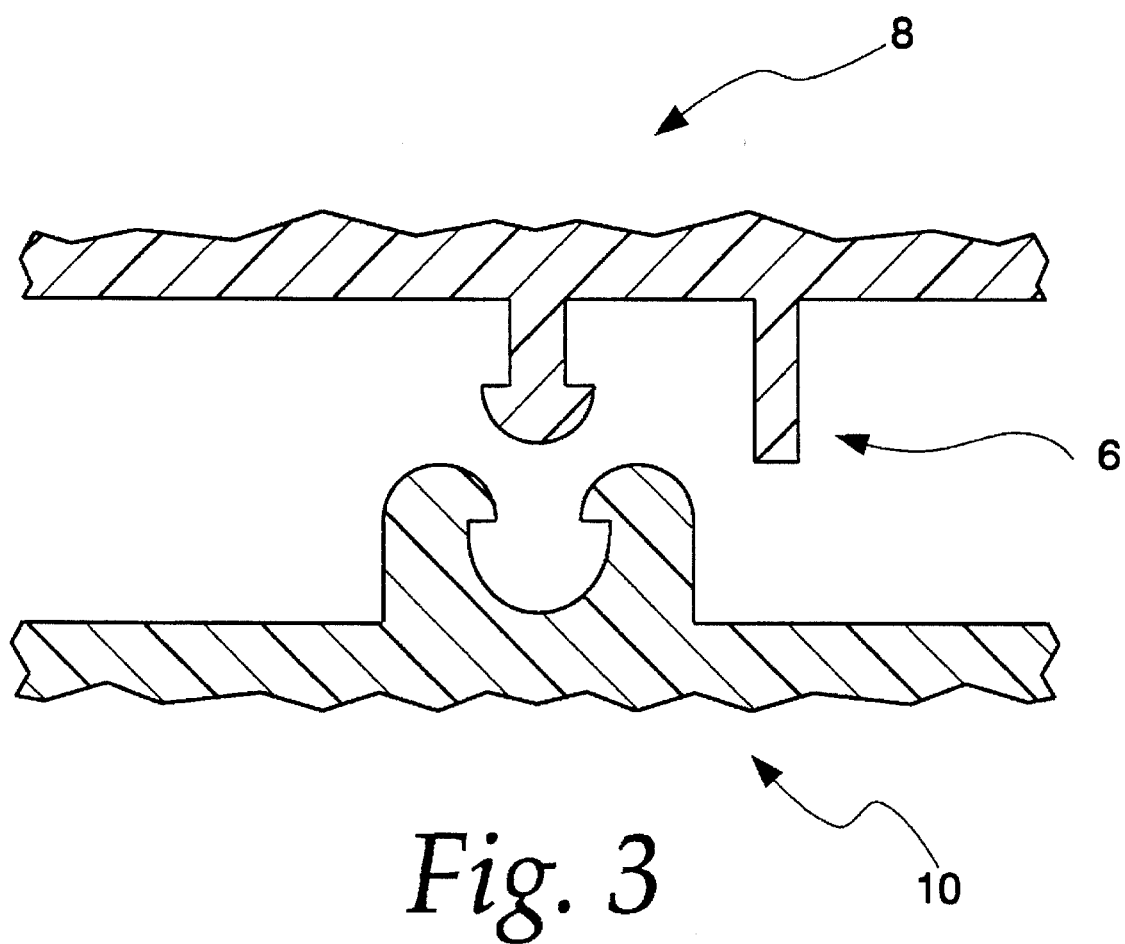
FIG. 3 is an illustration of one type of a reclosable seal device, a zipper, showing its male and female closure profiles.

The reclosable seal 6 of FIGS. 1 and 2 is shown in detail in FIG. 3 in its opened position. The reclosable seal 6 includes two parts, a male closure profile 8 and a female closure profile 10. When pressure is applied to the male and female closure profiles 8 and 10, they engage and form a reclosable sealing mechanism. Likewise, when the male and female profiles 8 and 10 are pulled away from each other, the two disengage and the package is opened. Generally, the male and female closure profile 8 and 10 are manufactured separately from the package and are subsequently attached to a package, such as the flexible closing package 2 and the rigid reclosable package 4 in FIGS. 1 and 2. The present invention relates to the structure of the male and female closure profiles 8 and 10 prior to, and after, being affixed to these packages.

Figure 4B:
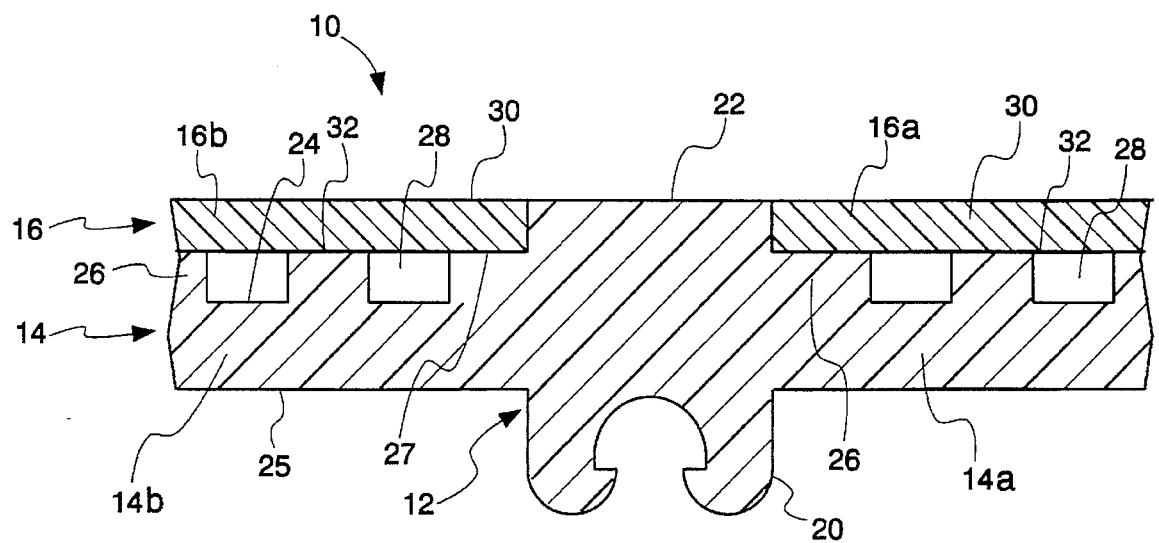
FIG. 4b is a sectional view of the female closure profile and sealant layer having interrupted rectangular channels after the co-extrusion process.
Figure 4A:
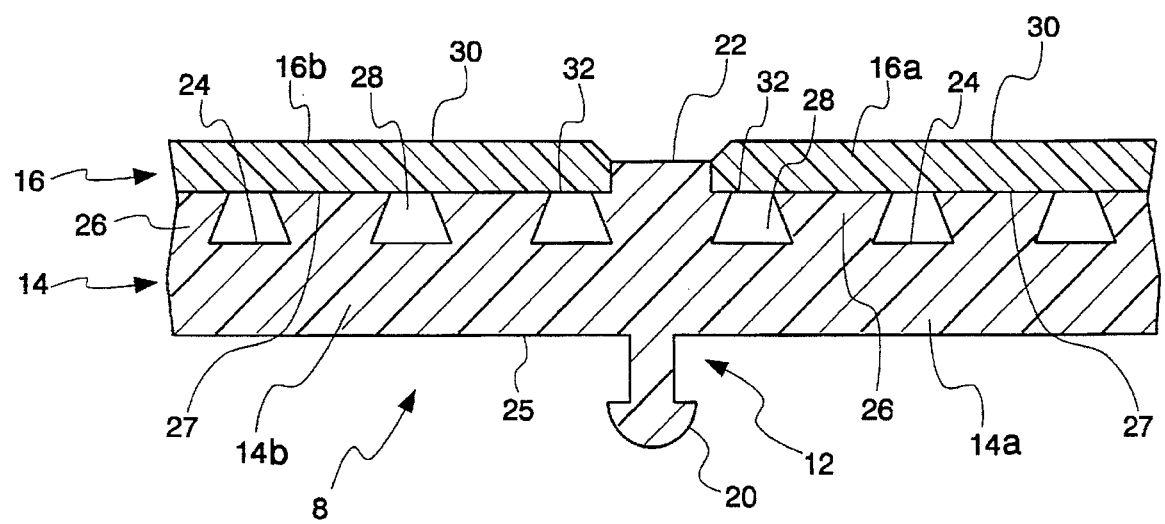
FIG. 4a is a sectional view of the male closure profile and sealant layer having interrupted triangular channels after the co-extrusion process.

FIGS. 4a and 4b are sectional views of a male closure profile 8 and a female closure profile 10, respectively, prior to attachment to a package. In FIG. 4a, the male closure profile 8 includes three primary components, the closure portion 12, a lateral flange 14, and a sealant layer 16. The closure portion 12 includes a closure element 20 and a base 22. The base 22 separates two sections 14a and 14b of the lateral flange 14. The lateral flange 14 includes an outer surface 24 from which ribs 26 extend in an upward direction as depicted in FIG. 4a. The closure element 20 protrudes below an inner surface 25 of the lateral flange 14. Each rib 26 has a outer segment 27 against which the sealant layer 16 is positioned. Because the ribs 26 are spaced apart along the outer surface 24, a plurality of voids, or channels 28, are formed. As shown in FIG. 4a, the cross-sectional area of each channel 28 is approximately triangular with a planar top apex which makes them actually trapezoidal. The lateral flange 14 and the closure portion 12 are generally made of the same material such as polyethylene or polypropylene. The use of a low-cost material, such as low density polyethylene (LDPE), for making the lateral flange 14 and the closure portion 12 results in a significant savings in materials cost compared to a profile strip made of a substantially pure ionomer resin, such as SURLYN® (trademark of E. I. DuPont de Nemours & Co. of Wilmington, Del.). Although the actual volume of the ionomer resin needed for a single profile strip appears small, a facility mass producing large amounts of resealable sealing devices would utilize large amounts of the ionomer resin. Thus, even a minor cost savings in such a material can result in a significant reduction in cost of material.

Generally, the sealant layer 16 is made of a different material than the lateral flange 14 and the closure portion 12. Because of two different materials being present in the male closure profile 8, the process by which the male closure profile 8 is produced is typically a co-extrusion process. The sealant layer 16, like the lateral flange 14, is divided into two sections 16a and 16b which are disposed above the flange sections 14a and 14b, respectively. The sealant layer 16 has a package side 30 and a closure profile side 32. The closure profile side 32 is attached to the outer segment 27 of the ribs 26 when the male closure profile 8 is co-extruded.

FIG. 4a also shows the base 22 terminating below the package side 30 of the sealant layer 16. This type of structure inhibits the base 22 from contacting the package during the initial stage of the heat-sealing process. Additionally, the top corner of the sealant layer 16 is chamfered on both sections 16a and 16b. This feature ensures that no sealant layer 16 is present after the heat-sealing process between the base 22 and the package against which it abuts.

FIG. 4b illustrates the female closure profile 10 which is very similar to FIG. 4a and, thus, has the same reference numerals as FIG. 4a. FIG. 4b illustrates that the structure of the sealant layer 16 and the lateral flange 14 is equally as useful on the female closure profile 10. Furthermore, this novel profile structure of the sealant layer 16 and the lateral flange 14 is useful on other types of closure devices as well. In addition, FIG. 4b illustrates that the channels 28 can be a variety of cross-sectional shapes such as rectangular. Further, it should be noted that these channels 28 can be semi-circular, elliptical, or completely non-uniform. The channels 28 serve an important function which is described below in reference to FIGS. 5a and 5b.

Also, FIG. 4b illustrates the base 22 as being flush with the package side 30 of the sealant layer 16 which is also different than FIG. 4a. When the base 22 is positioned against the package to which it will be attached during the heat-sealing process, the sealant layer 16 is not compressed as much as the sealant layer 16 in FIG. 4a. However, the sealant layer 16 still adheres to the lateral flange 14 and the package. As such, one of the two embodiments is better suited for a given combination of materials than the other when considering the coefficient of contraction, melting point, material hardness, etc. The term "coefficient of contraction" designates the degree of contraction of a material when it is cooled from a molten state to room temperature.

Generally, the lateral flange 14 is approximately between 0.125 inch and 1.0 inch in width. Also, the lateral flange 14 is typically in the range of 0.002 inch to 0.020 inch in thickness. The sealant layer 16 is approximately between 0.002 inch and 0.020 inch in thickness.

Figure 5A:
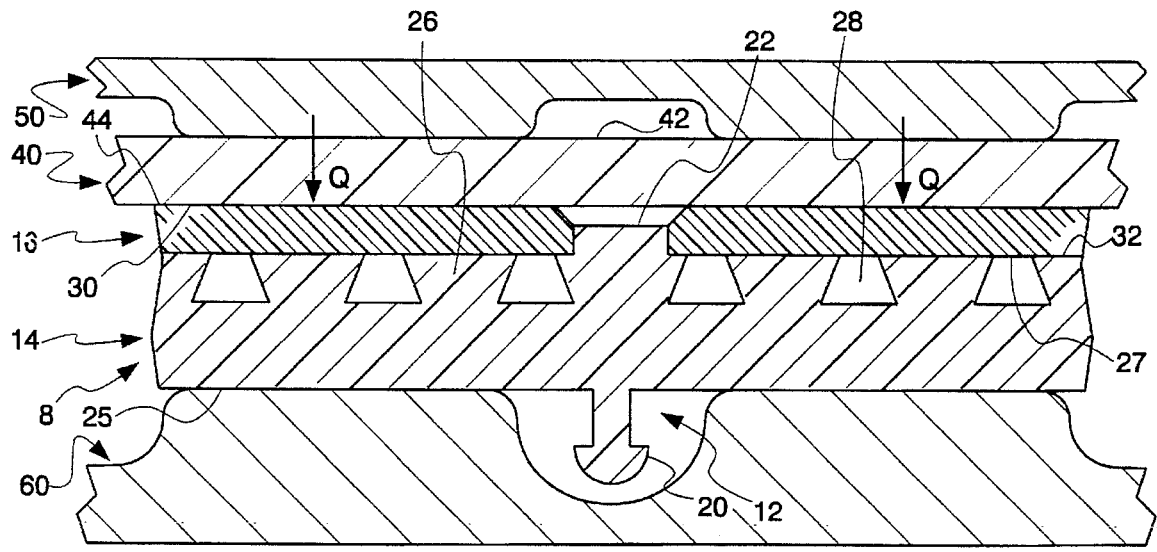
FIG. 5a is a sectional view of a package and the male closure profile in FIG. 4a before they have been made integral by the heat-sealing process.

FIG. 5a shows the male closure profile 8 of FIG. 4a with the package side 30 of the sealant layer 16 in contact with a substrate 40 of the package prior to the heat-sealing process which will attach the male closure profile 8 to the substrate 40. The substrate 40 includes an outer package surface 42 and an inner package surface 44. The inner package surface 44 engages the package side 30 of the sealant layer 16. The substrate 40 is typically a film used to make a package. The substrate 40 and, thus the package, are generally made of materials such as SURLYN®, low density polyethylene, polypropylene, polyester, or ethylene vinyl acetate (EVA). As such, the sealant layer 16 must be made of a material which adheres well to both the lateral flange 14 and the substrate 40.

During the heat-sealing process, a heat-sealing bar 50 is disposed above the substrate 40 and engages the outer package surface 42. A backing bar 60 engages the inner surface 25 of the lateral flange 14. This backing bar 60 may be resilient or rigid depending on the materials used which dictate the pressure and thermal requirements of the heat-sealing process.

The portion of the backing bar 60 near the closure element 20 and the portion of the sealing bar 50 around the base 22 of the closure portion 12 have voids 52 and 62 which serve two purposes. First, application of pressure to the base 22 of the closure portion 12 while attaching the male closure profile 8 to the substrate 40 may damage the closure elements 20. And second, the absence of the sealant layer 16 on the base 22 of the closure portion 12 allows the closure portion 12 to be independent of the substrate 40. The recessed base 22 and the chamfered corners of the sealant layer 16 near the base 22 assist in this function. Thus, the movement of the substrate 40, which is often made of a more rigid material than the male closure profile 8, is not likely to affect the integrity of the reclosable seal. For example, if the package is made of SURLYN® which is a relatively rigid material and the closure element 20 is made of polyethylene, the movement of the package or its contents is not likely to disturb the integrity of the reclosable seal. In other words, it is not likely to separate the closure element 20 from its locked position in the corresponding mating element. Thus, the substantial independence of the base 22 of the closure portion 12 from the substrate 40 derived from the lack of a sealant in that region provides a break point in a relatively inflexible coupling between the substrate 40 to the lateral flange 14. The advantages achieved in the embodiment of FIG. 5a due to the lack of the sealant layer 16 on the base 22 are the same for the other embodiments of this invention.

Figure 5B:
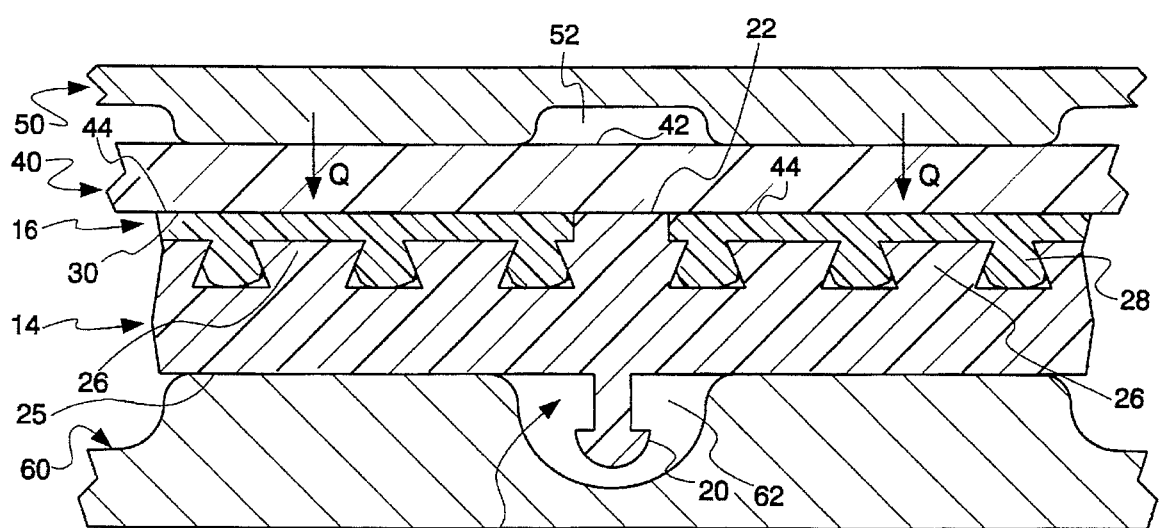
FIG. 5b is a sectional view of the package and the male closure profile in FIG. 5a after they have been made integral by the heat-sealing process.

FIG. 5b portrays the male closure profile 8 after the heat-sealing process has occurred but prior to the releasing of the heat-sealing bar 50 and the backing bar 60. When pressure is applied by the heat-sealing bar 50 and/or the backing bar 60, the substrate 40, the sealant layer 16 and the lateral flange 14 are "sandwiched" together. The sealant layer 16 is compressed as shown with the base 22 now being adjacent the inner package surface 42 of the substrate 40.

Due to the energy provided by the heat-sealing bar 50, a heat load Q transfers into and through the substrate 40. The heat load Q is substantial enough to raise the temperature of the sealant layer 40 beyond its melting point such that it begins to flow. As the heat load Q conducts through the sealant layer 16, it reaches the closure profile side 32 of the sealant layer 16 and conducts into the lateral flange 14 in regions where it contacts the same. The heat load Q cannot be conducted into the lateral flange 14 in the area above the channels 28 because the closure profile side 32 of the sealant layer 16 does not contact the lateral flange 14 in these regions. Consequently, the sealant layer 16 first begins to melt in these regions of the closure profile side 32 as the temperature in these regions quickly rises because the heat load Q cannot be conducted into the lateral flange 14. As this occurs, the melting sealant layer 16 above the channels 28 begins to fill the channels 28. Eventually, the entire sealant layer 16 begins to flow and adheres to the inner package surface 42 of the substrate 40 and the lateral flange 14 around the plurality of ribs 26. As shown in FIG. 5b, small pockets are created in the channels 28 which the sealant layer 16 does not fill such as near the inside corners of the channels 28. However, due to the increased surface area created by the addition of the ribs 26 on the lateral flange 14 to which the sealant layer 16 adheres, the strength of the bond is enhanced. Moreover, the sealant layer 16 adheres across the entire inner package surface 42 of the substrate 40.

This method of sealing closure profiles enhances bonding while not distorting the closure profile in the co-extrusion process. If the sealant layer 16 was placed as a flat sheet on the lateral flange 14 which has no ribs 26, then the lateral flange 14 would become distorted after the co-extrusion process due to the difference in the coefficients of contraction between materials in the lateral flange 14 and the materials comprising the sealant layer 16. The coefficient of contractions of the two materials are generally different by about 10% to 25%. Thus, the co-extrusion of the sealant layer 16 as a single, continuous layer simultaneously with a planar lateral flange 14 would typically result in the deformation of the lateral flange 14. The lateral flange 14 would then curl in the direction of the material having a higher coefficient of contraction after the lateral flange 14 and the sealant layer 16 have cooled. In the present invention, when only the sealant layer 16 contacts the outer segments 27 of the ribs 26, the ribs 26 may slightly distort. However, the main portion of the lateral flange 14 is generally spared from the deformation and, thus, remains substantially planar.

Figure 6A:
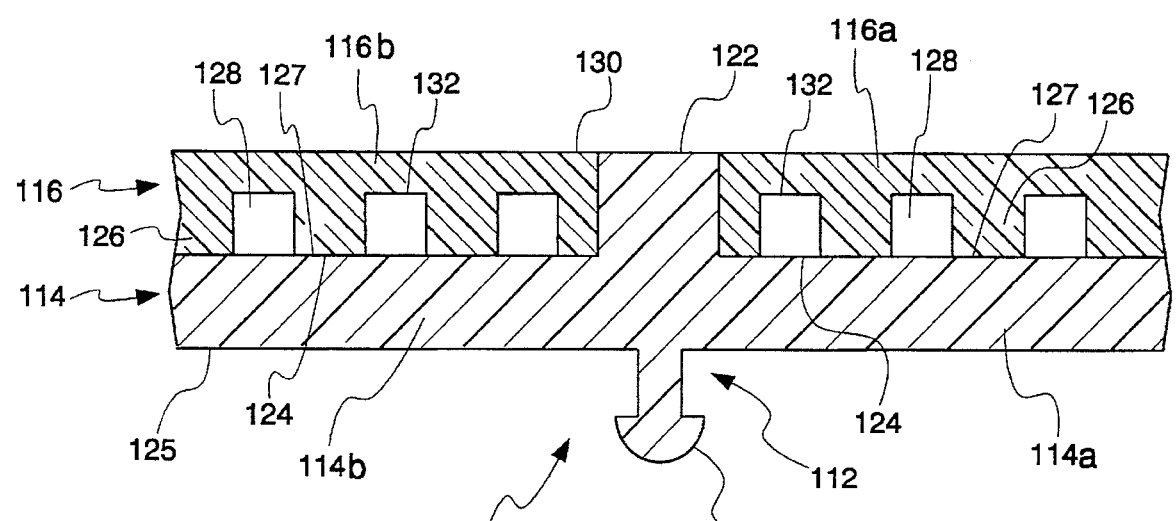
FIG. 6a is a sectional view of an alternative male closure profile having interrupted rectangular channels in the sealant layer after the co-extrusion process.
Figure 6B:
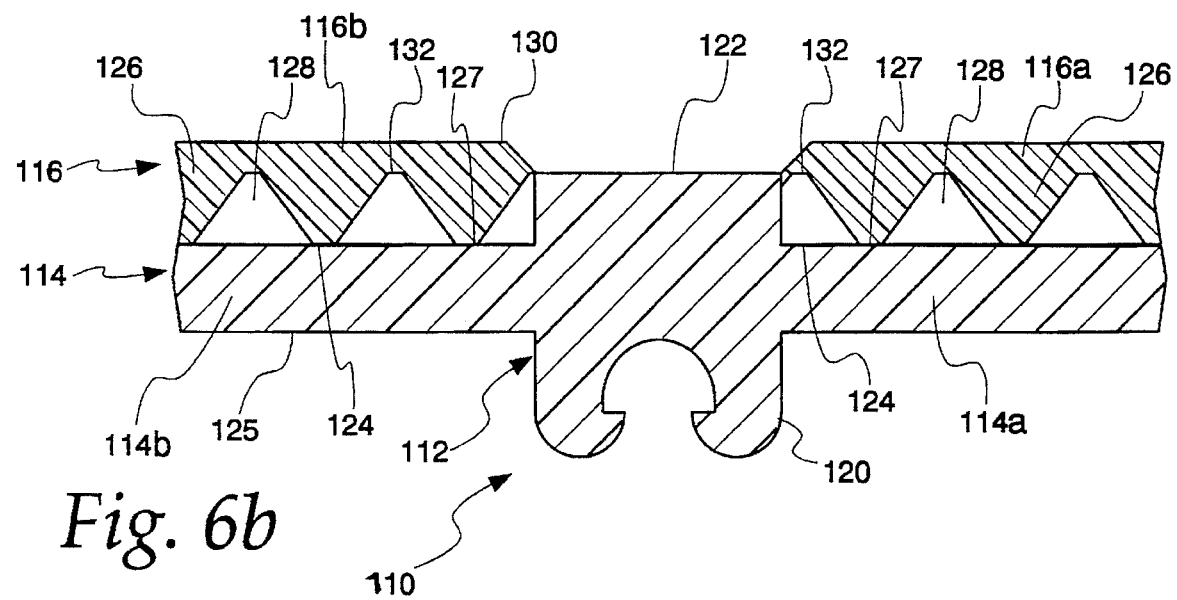
FIG. 6b is a sectional view of an alternative female closure profile having interrupted triangular channels in the sealant layer after the co-extrusion process.

FIG. 6a and 6b depict alternative embodiments of the present invention. All reference numerals are shown in the 100 series which correspond to the previously cited reference numerals on the structure of FIGS. 4a and 4b. The main difference in FIGS. 6a and 6b is that the lateral flange 114 has no ribs. Instead, the sealant layer 116 is now designed with ribs 126 which extend downwardly from the closure profile side 132 of the sealant layer 116. End segments 127 of the ribs 126 are connected to an outer surface 124 of the lateral flange 114. Thus, the channels 128 are formed by the ribs 126 on the sealant layer 116. FIG. 6a illustrates a male closure profile 108 having rectangular shaped channels 128. FIG. 6b shows a female closure profile 110 having triangular shaped channels 128. Clearly, numerous other cross-sectional shapes of the channels 128 could be employed.

FIGS. 6a and 6b, similar to respective FIGS. 4a and 4b, are shown with the base 122 of the closure element 112 being flush with the package side 130 of the sealant layer 116 and with the base 122 below the package side 130 of the sealant layer 116, respectively. Both embodiments suit the purpose of allowing the sealant layer 116 to adhere to both the lateral flange 114 and the package without having the base 122 being sealed to the package.

The embodiments of FIGS. 6a and 6b have very similar heat transfer characteristics to the embodiments of FIGS. 4a and 4b when the heat-sealing process is utilized. As the heat is transferred into the package side 130 of the sealant layer 116, the heat conducts through the sealant layer 116 and into the lateral flange 114 in those areas where the two components meet at the end segments 127 of the ribs 126. But, in the region of the sealant layer 116 above the channels 128, the heat cannot be directly conducted from the sealant layer 116 into the lateral flange 114, and the temperature rises at a faster rate. Consequently, the sealant layer 116 first begins to flow at the regions above the channels 128.

Both structures, the embodiments of FIGS. 4a and 4b, and the alternative embodiments of FIG. 6a and 6b, tend to more readily initiate the melting process of the sealant layer due to the addition of the channels. As such, if the heat-sealing process mistakenly utilizes an improper dwell time or inadequate heat load, then there is still a high probability that a portion of the sealant layer will still be melted and adhere to the lateral flange and substrate. The same is also true if the heat-sealing bar is inadvertently misaligned.

In a further embodiment, the package can also include channels. Thus, the sealant layer would adhere to the channels in the package as well.

Each of these embodiments and obvious variations thereof is contemplated as falling within the spirit and scope of the invention, which is set forth in the following claims.

What is claimed is:

1. A profile sealing strip to be affixed to a package and thereby provide said package with a resealable closure, comprising:

a lateral flange having first and second sections, said first and second sections each having a length, an outer surface, an inner surface and a plurality of ribs extending along said length of said outer surface, adjacent ones of said plurality of ribs forming a channel therebetween adjacent said outer surfaces;

a closure portion having a closure means and a base, said base having a bottom and being disposed between and connected to said first and second sections of said lateral flange, said closure means protruding beyond said inner surfaces of said first and second sections of said lateral flange; and a sealant layer having a first portion and a second portion, said first portion of said sealant layer being affixed to an outer segment of said plurality of ribs on said first section of said lateral flange, said second portion of said sealant layer being affixed to an outer segment of said plurality of ribs on said second section of said lateral flange.

2. The profile sealing strip of claim 1, wherein said bottom of said base of said closure portion protrudes beyond said outer surfaces of said first and second sections of said lateral flange.

3. The profile sealing strip of claim 2, wherein said sealant layer further including a package side contacting said package, said bottom of said base of said closure portion is disposed between said outer surfaces of said first and second sections of said lateral flange and said package side of said sealant layer.

4. The profile sealing strip of claim 1, wherein at least one of said channels has a substantially rectangular cross-sectional shape.

5. The profile sealing strip of claim 1, wherein at least one of said channels has a substantially triangular cross-sectional shape.

6. The profile sealing strip of claim 1, wherein each of said plurality of ribs is substantially parallel to said closure means.

7. The profile sealing strip of claim 1, wherein said lateral flange and said closure portion are made of a first material, and said sealant layer is made of a second material.

8. The profile sealing strip of claim 7, wherein said first material and said second material have a substantially different coefficient of contraction.

9. The profile sealing strip of claim 7, wherein said first material is made of a material selected from the group consisting of polyethylene, low density polyethylene, and polypropylene.

10. The profile sealing strip of claim 7, wherein said second material is made of a material selected from the group consisting of ethylene vinyl acetate, ethylene acrylic acid, a polymer rubber resin blend, and ethylene-methyl acrylate.

11. A profile sealing strip for affixing to a package and thereby providing said package with a resealable closure, comprising:

a sealant layer having a first and second portion, each of said portions having a length, a closure profile side, and a plurality of ribs extending along said length from said closure profile side, adjacent ones of said plurality of ribs forming a channel therebetween;

a lateral flange having first and second sections, said first and second sections each having an outer surface and an inner surface, said outer surface of said first section of said lateral flange being connected to an end segment of said plurality of ribs on said first portion of said sealant layer, said outer surface of said second section of said lateral flange being connected to an end segment of said plurality of ribs on said second portion of said sealant layer; and a closure portion having a closure means and a base, said base having a bottom and being disposed between and connected to said first and second sections of said lateral flange, said closure means protruding beyond said inner surfaces of said first and second sections of said lateral flange.

12. The profile sealing strip of claim 11, wherein said bottom of said base of said closure portion protrudes beyond said outer surfaces of said first and second sections of said lateral flange.

13. The profile sealing strip of claim 12, wherein said sealant layer includes a package side connected to said package, said bottom of said base of said closure portion being disposed between said package side of said sealant layer and said outer surfaces of said first and second sections of said lateral flange.

14. The profile sealing strip of claim 11, wherein at least one of said channels has a substantially rectangular cross-sectional shape.

15. The profile sealing strip of claim 11, wherein at least one of said channels has a substantially triangular cross-sectional shape.

16. The profile sealing strip of claim 11, wherein each of said plurality of ribs is substantially parallel to said closure means.

17. The profile sealing strip of claim 11, wherein said lateral flange and said closure portion are made of a first material, and said sealant layer is made of a second material.

18. The profile sealing strip of claim 17, wherein said first material and said second material have a substantially different coefficient of contraction.

19. The profile sealing strip of claim 17, wherein said first material is made of a material selected from the group consisting of polyethylene, low density polyethylene, and polypropylene.

20. The profile sealing strip of claim 17, wherein said second material is made of a material selected from the group consisting of ethylene vinyl acetate, ethylene acrylic acid, a polymer rubber resin blend, and ethylene-methyl acrylate.

21. A profile sealing strip affixed to a package to provide said package with a resealable closure, comprising:

a lateral flange having first and second sections, said first and second sections having a length, an outer surface, an inner surface, and a plurality of ribs extending along said length of said outer surface, adjacent ones of said plurality of ribs forming a channel therebetween adjacent said outer surface;

a closure portion having a closure means and a base, said base being disposed between and connected to said first and second sections of said lateral flange, said closure means protruding beyond said inner surfaces of said first and second sections of said lateral flange; and a sealant layer having a first portion and a second portion, said first portion of said sealant layer being affixed on surfaces of said plurality of ribs located on said first section of said lateral flange and to a surface on said package, said second portion of said sealant layer being affixed on surfaces of said plurality of ribs located on said second section of said lateral flange and to a surface on said package.

22. A method of attaching a profile sealing strip to a package, said profile sealing strip including a lateral flange with first and second sections, a closure portion, and a sealant layer; said first and second sections of said lateral flange each having a length, an outer surface, an inner surface, and a plurality of ribs extending along said length of said outer surface, adjacent ones of said plurality of ribs forming a channel therebetween;

said closure portion having a closure means and a base, said base being disposed between and connected to said first and second sections of said lateral flange, said closure means protruding beyond said inner surfaces of said first and second sections; and said sealant layer having a first portion and a second portion, said first portion of said sealant layer being affixed to an outer segment of said plurality of ribs on said first section of said lateral flange, said second portion of said sealant layer being affixed to an outer segment of said plurality of ribs on said second section of said lateral flange; said method comprising the steps of:

positioning said profile sealing strip adjacent said package with said sealant layer contacting said package;

placing a heat-sealing bar against said package;

applying heat to said package by said heat-sealing bar, said heat conducting through said package and into said sealant layer, said heat being substantial enough to raise the temperature in said sealant layer above a melting point of a material comprising said sealant layer, said material flowing into said channels between said ribs;

applying pressure to said sealant layer;

cooling said sealant layer to a temperature below said melting point of said material comprising said sealant layer; and relieving said pressure from said sealant layer.

23. A method of claim 22, wherein said step of applying said pressure includes the step of placing a second bar against said inner surfaces of said first and second sections of said lateral flange.

24. A method of attaching a profile sealing strip to a package, said profile sealing strip including a lateral flange with a first and second section, a closure portion, and a sealant layer with a first and second portion, said first and second portions of said sealant layer having a length, a closure profile side, and a plurality of ribs extending along said length from said closure profile side, adjacent ones of said plurality of ribs forming a channel therebetween;

said first and second sections of said lateral flange having an outer surface and a inner surface, said outer surface of said first section of said lateral flange being connected to an end segment of said plurality of ribs on said first portion of said sealant layer, said outer surface of said second section of said lateral flange being connected to an end segment of said plurality of ribs on said second portion of said sealant layer; and said closure portion having a closure means and a base, said base being disposed between and connected to said first and second sections of said lateral flange, said closure means protruding beyond said inner surfaces of said first and second sections of said lateral flange, said method comprising the steps of:

positioning said profile sealing strip adjacent said package with said sealant layer contacting said package;

placing a heat-sealing bar against said package;

applying heat to said package by said heat-sealing bar, said heat conducting through said package and into said sealant layer, said heat being substantial enough to raise the temperature in said sealant layer above a melting point of a material comprising said sealant layer;

applying pressure to said sealant layer;

cooling said sealant layer to a temperature below said melting point of said material comprising said sealant layer; and relieving said pressure from said sealant layer.

25. A method of claim 24, wherein said step of applying said pressure includes the step of placing a second bar against said inner surfaces of said first and second sections of said lateral flange.

* * * * *